(12) United States Patent
Chien (10) Patent No.: US 8,756,749 B2
(45) Date of Patent: Jun. 24, 2014

(54) WINDSHIELD WIPER ADAPTER AND WINDSHIELD WIPER ASSEMBLY

(75) Inventor: Ching-Chuan Chien, Taipei (TW)

(73) Assignee: Unipoint Electric Mfg. Co., Ltd., Taipei (TW)

( * ) Notice: Subject to any disclaimer, the term of this patent is extended or adjusted under 35 U.S.C. 154(b) by 336 days.

(21) Appl. No.: 13/297,896

(22) Filed: Nov. 16, 2011

(65) Prior Publication Data
US 2013/0117956 A1    May 16, 2013

(51) Int. Cl.
*B60S 1/40* (2006.01)
(52) U.S. Cl.
USPC .......... 15/250.32; 15/250.351; 15/250.43
(58) Field of Classification Search
CPC ........ B60S 1/40; B60S 1/4038; B60S 1/4045; B60S 1/4048; B60S 1/4087; B60S 1/4003
USPC ............ 15/250.32, 250.351, 250.43, 250.44, 15/250.31, 250.361
See application file for complete search history.

(56) References Cited

U.S. PATENT DOCUMENTS

| 7,774,892 | B2 * | 8/2010 | Coughlin | 15/250.32 |
| 2005/0177970 | A1 * | 8/2005 | Scholl et al. | 15/250.32 |
| 2007/0067941 | A1 * | 3/2007 | Huang | 15/250.32 |
| 2011/0277265 | A1 * | 11/2011 | Ehde | 15/250.32 |
| 2013/0025084 | A1 * | 1/2013 | Tolentino et al. | 15/250.32 |

* cited by examiner

*Primary Examiner* — Gary Graham
(74) *Attorney, Agent, or Firm* — Wang Law Firm, Inc.; Li K. Wang; Stephen Hsu (57) ABSTRACT

A windshield wiper adapter and windshield wiper assembly are disclosed. The windshield wiper adapter comprises a main body and a flexible buckling device. A front end of the main body has a notch that is downwardly recessed. The notch is used for snapping with a protrusion portion of a windshield wiper arm at an arbitrary angle. One end of the flexible buckling device is connected to a surface of the main body while another end is upwardly extended toward an upper side of the main body. The flexible buckling device is used for buckling a leaning side of a through hole of the windshield wiper arm. After the notch is coupled to the protrusion portion, the windshield wiper arm is rotated about a coupling portion therebetween, such that the flexible buckling device is propped by the leaning side of the through hole to firstly perform a deformation process.

16 Claims, 11 Drawing Sheets

WINDSHIELD WIPER ADAPTER AND WINDSHIELD WIPER ASSEMBLY

BACKGROUND OF THE INVENTION

1. Field of the Invention

The present invention relates to a windshield wiper adapter and a windshield wiper assembly, and more particularly to a windshield wiper adapter and a windshield wiper assembly for fastening windshield wiper arms by utilizing flexible buckling bodies.

2. Description of the Related Art

Automobiles are currently widely used transportations for populace. While on rainy and windy days, automobiles are not only taken as a tool for transportation, but a shelter from wind and rain by comparing with bicycles or motorcycles.

Figure 1:
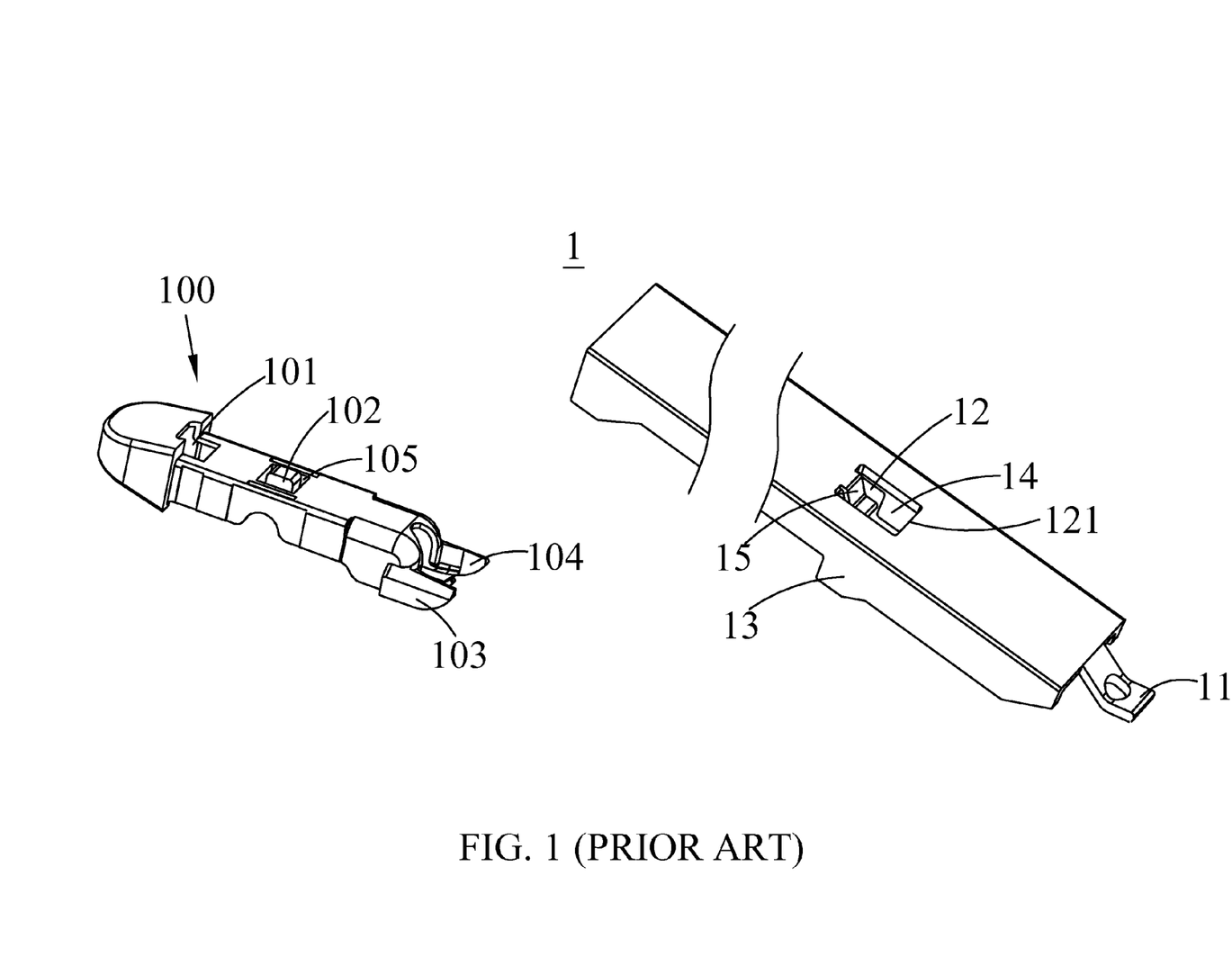
FIG. 1 is a schematic diagram of a windshield wiper adapter and a windshield wiper arm of the prior art.
Figure 2:
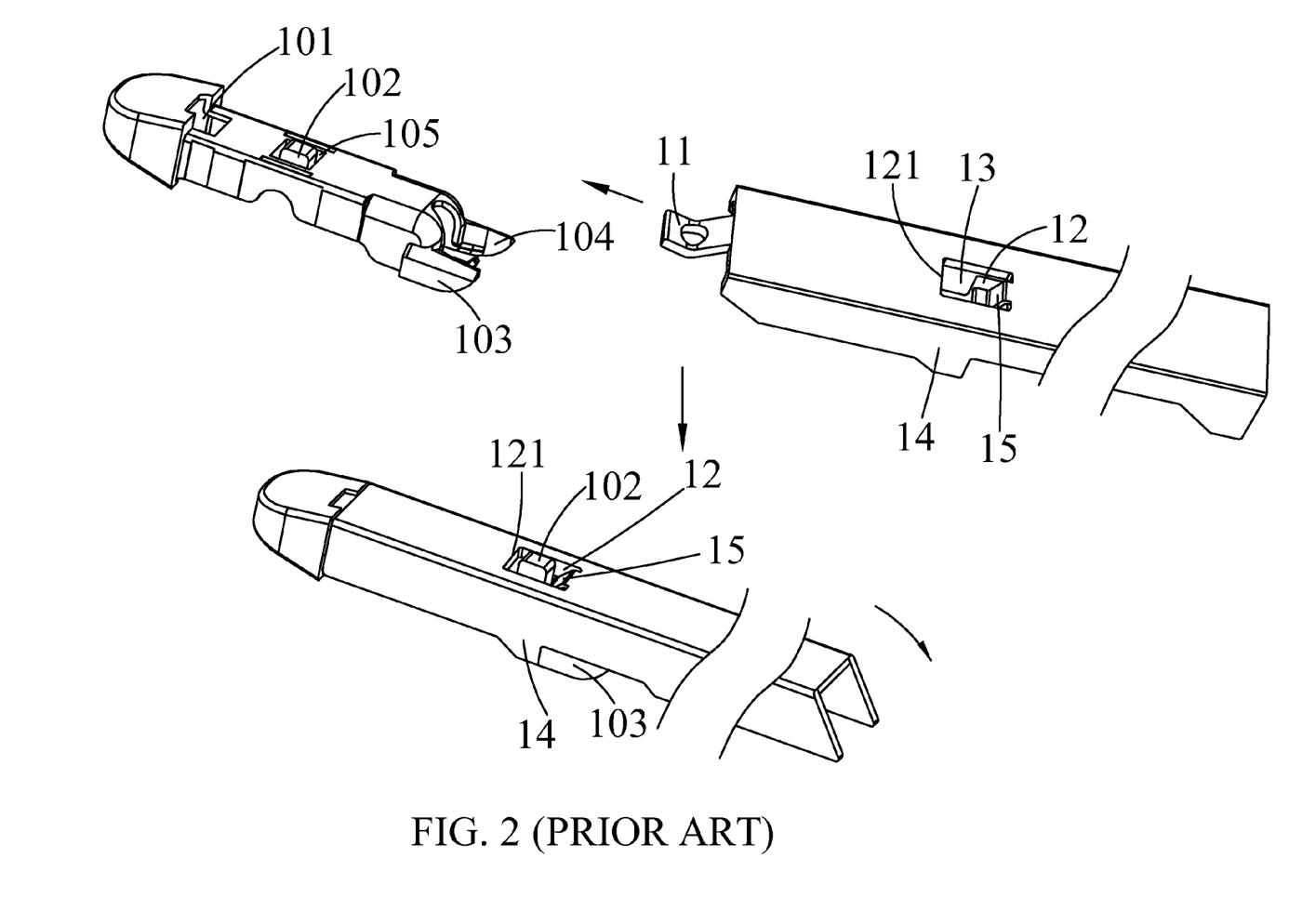
FIG. 2 is a schematic diagram of assembling a windshield wiper adapter and a windshield wiper arm of the prior art.

Each automobile is always installed with windshield wipers. The windshield wipers can remove rain drops or dirt on the windshield during rainy days to enhance the driving safety. The windshield wipers are connected to a windshield wiper motor through a windshield wiper assembly to achieve the objective of wiping water drops on a glass surface. With reference to FIG. 1, in which a schematic diagram of a windshield wiper adapter and a windshield wiper arm of the prior art is depicted. Components of the windshield wiper assembly typically comprise a windshield wiper adapter 100 and a windshield wiper arm 1. Currently, the windshield wiper adapter 100 is usually equipped with a notch 101 at a front end while another end is disposed with a convex hull 102. Two sides of the rear end are disposed with fastening components 103, 104 made of hardness materials. While assembling the windshield wiper adapter 100 and the windshield wiper arm 1, the protrusion portion 11 of the windshield wiper arm 1 is obliquely inserted into the notch 101 in front of the windshield wiper adapter 100 in a certain limited range of angles, such that a leading side 121 of a through hole 12 of the windshield wiper arm 1 can smoothly cross the convex hull 102 of the windshield wiper adapter 100 and downwardly press the windshield wiper adapter 100, thereby the convex hull 102 of the windshield wiper adapter 100 can pass through the through hole 12 of the windshield wiper arm 1. And additionally, a downwardly recessed tongue portion 15 disposed on the side relative to the leading side 121 of the through hole 12 of the windshield wiper arm 1 is also downwardly embedded into the accommodating space 105 below the convex hull 102 of the windshield wiper adapter 100 and leans against the convex hull 102, such that the convex hull 102 of the windshield wiper adapter 100 can tightly lean against the leading side 121 of the through hole 12 of the windshield wiper arm 1. Finally, fastening components 103, 104 of the two sides of the rear end of the windshield wiper adapter 100 are utilized to mutually wedge and fasten a first barb portion 13 and a second barb portion 14 of the windshield wiper arm 1, thereby completing the assembly procedure, as showed in FIG. 2.

According to the foregoing depiction, the windshield wiper adapter of connecting the windshield wiper arm in the prior art has the following defects:

1. While connecting the windshield wiper adapter 100 in the prior art to the windshield wiper arm 1, a specific range of insertion angles is required to allow the leading side 121 of the through hole 12 of the windshield wiper arm 1 to across the convex hull 102 of the windshield wiper adapter 100, thereby allowing the convex hull 102 smoothly passing through the through hole 102 and enable the tongue portion 15 to embed into the accommodating space 105, so as to mutually lodge the fastening components 103, 104 of the two sides of the rear end of the windshield wiper adapter 100 with the first barb portion 13 and the second barb portion 14 of the windshield wiper arm 1. However, the specific range of insertion angles is usually narrow and causes the difficulty in assembling both, resulting in inconvenience during the usage.

2. The windshield wiper adapter 100 in the prior art is connected to the windshield wiper arm 1 in a way that the convex hull 102 of the windshield wiper adapter 100 passes through the through hole 12 of the windshield wiper arm 1, and the tongue portion 15 of the windshield wiper arm 1 is embedded into the accommodating space 105 and leans against the convex hull 102 of the windshield wiper adapter 100, such that the convex hull 102 tightly leans against the leading side 121 of the through hole 12. Therefore, while performing the detachment motion, a user must take a certain manner and impose a force to separate the tongue portion 15 of the windshield wiper arm 1 from the convex hull 102 of the windshield wiper adapter 100. Thus, the process that the windshield wiper arm 1 obliquely moves toward the rear side and is separated from the windshield wiper adapter 100 results in complicated situation and inconvenience during the detachment process.

3. In the foregoing prior art, since the front end of the windshield wiper adapter 100 is the notch 101 and the fastening components 103, 104 at two sides of the rear end are hardness materials, both of the fastening components 103, 104 are non-movable flexible components or soft components. While assembling or detaching the windshield wiper adapter 100 and the windshield wiper arm 1, a buffer is unable to be obtained during the fastening components 103, 104 of the windshield wiper adapter 100 mutually lodged with the first barb portion 13 and the second barb portion 14 of the windshield wiper arm 1, and therefore causes great friction between the fastening components 103, 104 and the first barb portion 13 and the second barb portion 14. After long term use, the fastening components 103, 104 are usually damaged and rubbed by the first barb portion 13 and the second barb portion 14 to cause abrasion, gradually resulting in reduced snap force. Consequently, the windshield wiper adapter 100 and the windshield wiper arm 1 are easily worn to cause unstable installment.

SUMMARY OF THE INVENTION

In view of the shortcomings of the prior art, the inventor(s) of the present invention based on years of experience in the related industry to conduct extensive researches and experiments, and finally developed a windshield wiper adapter and windshield wiper assembly as a principle objective to overcome problems of difficulty in assembling and detaching the windshield wiper adapter and the windshield wiper arm in prior arts and abrasion to unstably install both elements after long period usage.

To achieve the foregoing objective, the windshield wiper adapter is provided and comprises a main body and a flexible buckling device. A front end of the main body has a notch that is downwardly recessed. The notch is provided for coupling to a protrusion portion of the windshield wiper arm at an arbitrary angle. One end of the flexible buckling device is connected to a surface of the main body while another end is upwardly extended toward an upper side of the main body. The flexible buckling device is provided for buckling a leading side of a through hole of the windshield wiper arm. After the notch is coupled to the protrusion portion, the windshield wiper arm is rotated about a coupling portion therebetween, so that the flexible buckling device is engaged with the leading side of the through hole to firstly perform a deformation process toward a direction away from the leading side of the through hole, and then the flexible buckling device is lodged with the leading side of the through hole after restoring from the deformation process, thereby fastening the windshield wiper arm on the main body.

Preferably, the windshield wiper adapter further comprises a lodging device arranged on two sides of a rear end of the main body. When the flexible buckling device is lodged with the leading side of the through hole, the lodging device mutually leans against and lodges a barb portion of the windshield wiper arm.

Preferably, the flexible buckling device comprises a flexible portion and a buckling portion. The flexible portion is connected to the buckling portion and forms a cavity therebetween. The buckling portion further comprises a guiding surface. When the through hole is approached to the flexible buckling device, the guiding surface leans against the leading side of the through hole to allow the flexible portion to perform the deformation process toward the direction away from the leading side of the through hole. After the leading side crosses the buckling portion and is guided by the guiding surface to the cavity and mutually leans against each other, and then the flexible portion is restored from the deformation process to couple to a portion of a top surface of the windshield wiper arm through the buckling portion.

According to the objective of the invention, a windshield wiper assembly is further provided and comprises a windshield wiper adapter and a windshield wiper arm. The windshield wiper adapter comprises a main body. A front end of the main body is disposed with a notch. A surface of the main body is connected to a flexible buckling body. The flexible buckling body comprises a flexible portion and a buckling portion. The flexible portion is connected to the buckling portion and forms a cavity. The buckling portion further comprises a guiding surface. One end of the windshield wiper arm is disposed with a protrusion portion. A surface of the windshield wiper arm is disposed with a through hole. After the notch is coupled to the protrusion portion, the windshield wiper arm is rotated about a coupling portion therebetween, so that the guiding surface of the buckling portion is engaged with a leading side of the through hole to firstly perform a deformation process toward a direction away from the leading side of the through hole. After the leading side crosses the buckling portion and is guided by the guiding surface to the cavity and mutually leans against to each other, the flexible portion is restored from the deformation process to lodge a portion of a top surface of the windshield wiper arm through the buckling portion, thereby fastening the windshield wiper arm on the main body.

Preferably, the windshield wiper adapter further comprises a first lodging portion and a second lodging portion respectively disposed on two sides of a rear end of the main body. Two sides of the windshield wiper arm further comprise a first barb portion and a second barb portion. When the buckling portion lodges the windshield wiper arm, the first lodging portion and the second lodging portion respectively lean against and lodge the first barb portion and the second barb portion of the windshield wiper arm.

The windshield wiper adapter and the windshield wiper assembly of the invention may have one or more advantages as the following:

(1) According to the windshield wiper adapter of the invention, while assembling the windshield wiper arm, the notch in front of the windshield wiper adapter is coupled to the protrusion portion of the windshield wiper arm. The windshield wiper arm is rotated about a coupling portion therebetween, and the leading side of the through hole of the windshield wiper arm crosses the buckling portion of the flexible buckling device to lodge the flexible buckling device, thereby fastening the windshield wiper arm on the windshield wiper adapter. Since the windshield wiper adapter mainly utilizes the flexible buckling device to lodge the windshield wiper arm, the flexible buckling device is an element capable of performing the deformation process. While in an assembly motion of snapping the protrusion portion of the windshield wiper arm and the notch of the windshield wiper adapter, the range of the angles for assembly are not obviously restricted. Accordingly, when the windshield wiper adapter is connected to the windshield wiper arm, it is not restricted by angles by comparing with conventional techniques so as to increase convenience during assembling.

(2) Since the windshield wiper adapter of the invention mainly utilizes the flexible buckling device capable of being deformed to lodge the windshield wiper arm, and the flexible buckling device is located on the windshield wiper adapter, while detaching the windshield wiper adapter from the windshield wiper arm, a user only needs to bend the flexible buckling device to easily detach the windshield wiper adapter from the windshield wiper arm, thereby achieving convenience.

(3) Since the windshield wiper adapter utilizes the flexible buckling device to lodge the windshield wiper arm, the flexible buckling device is a component capable of movably performing a deformation process such that while assembling the windshield wiper adapter with the windshield wiper arm, the lodging device of the windshield wiper adapter is lodged with the barb portions of the windshield wiper arm to obtain a buffer therethrough. It effectively reduces the friction between the lodging device and the barb portion, and thereby preventing the lodging device from being damaged and rubbed by the barb portion.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 3:
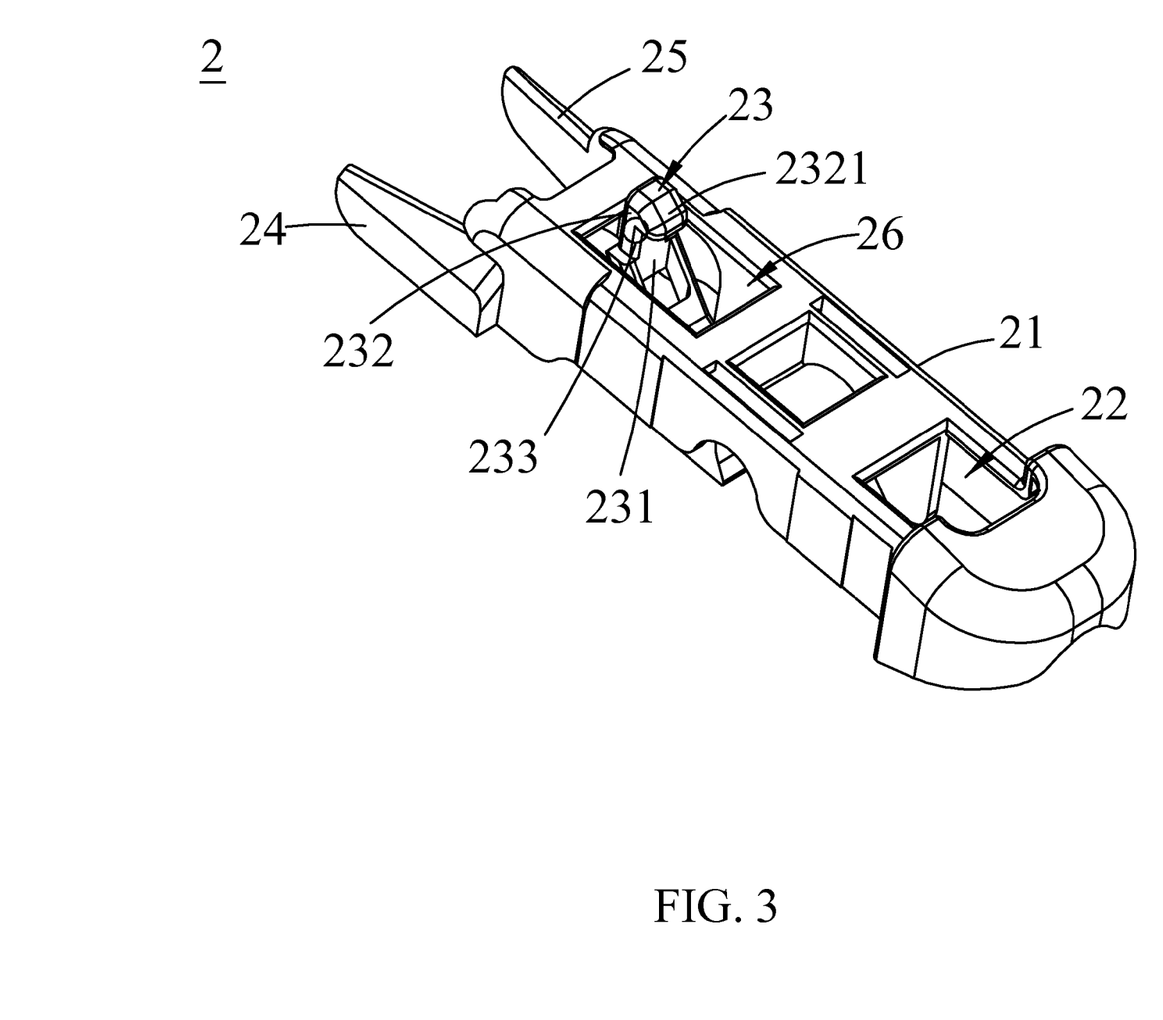
FIG. 3 is a first schematic diagram of a windshield wiper adapter according to an embodiment of the invention.
Figure 4:
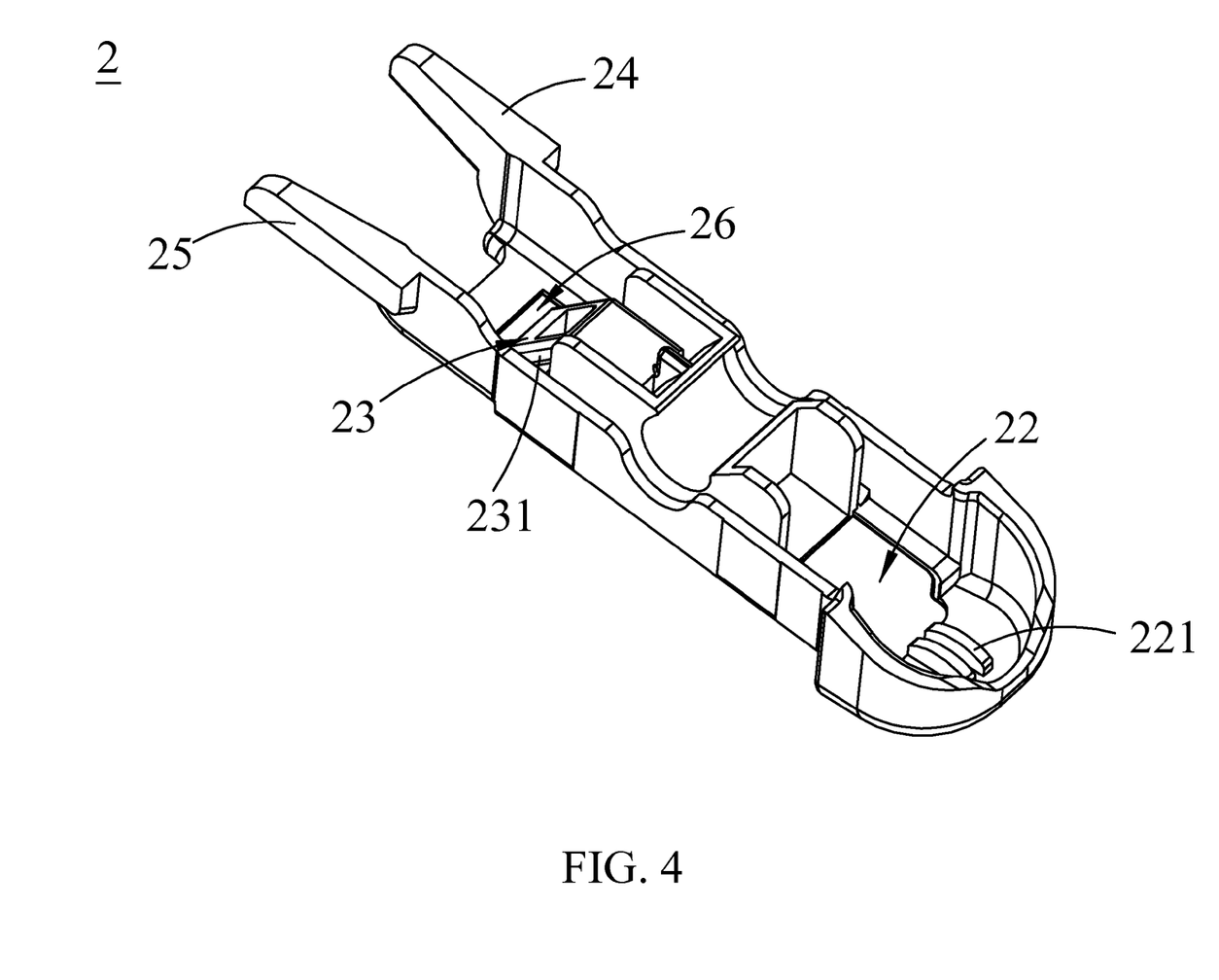
FIG. 4 is a second schematic diagram of a windshield wiper adapter according to an embodiment of the invention.
Figure 5:
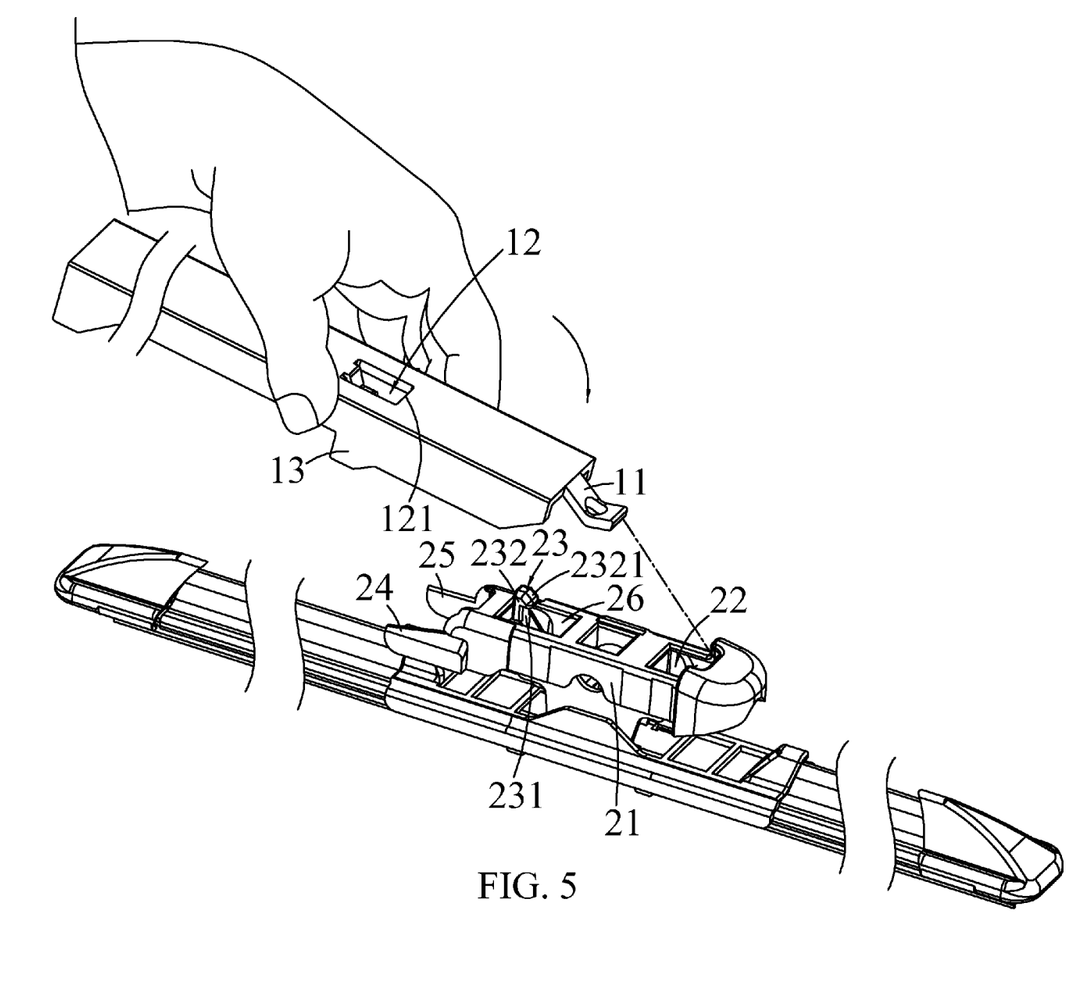
FIG. 5 is a first schematic diagram of assembling a windshield wiper adapter and a windshield wiper arm according to an embodiment of the invention.
Figure 6:
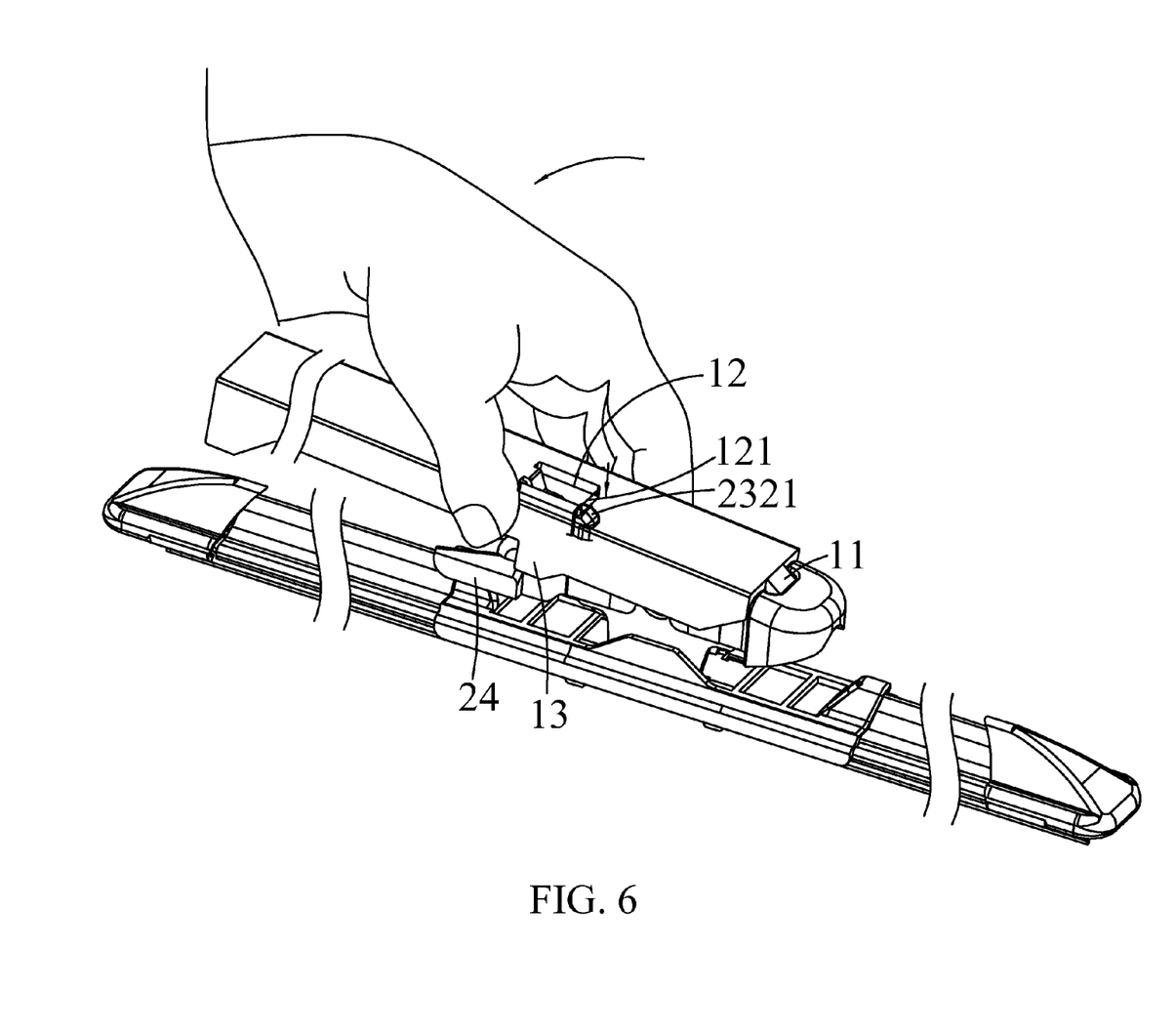
FIG. 6 is a second schematic diagram of assembling a windshield wiper adapter and a windshield wiper arm according to an embodiment of the invention.

With reference to FIG. 3 and FIG. 4, in which a first schematic diagram and a second schematic diagram of a windshield wiper adapter according to the invention are depicted. The first schematic diagram is a three-dimensional top view of the windshield wiper adapter 2. The second schematic diagram is a three-dimensional bottom view of the windshield wiper adapter 2. The windshield wiper adapter 2 of the embodiment comprises a main body 21, a flexible buckling body 23, a first lodging portion 24 and a second lodging portion 25. The main body 21 is a rectangular structure, and a front end of the main body 21 is round in shape, but it is not limited thereto while actually implementing the invention. A front end of the main body 21 has a notch 22 downwardly recessed to be engaged with the protrusion portion 11 of the conventional windshield wiper arm 1. A protruding rib 221 is disposed in the notch 22. The protrusion portion 11 can be an arc-shaped sheet body. When the protrusion portion 11 is inserted into the notch 22, the protruding rib 221 is correspondingly provided as a leading surface against the protrusion portion 11. One surface of the main body 21 further has an accommodating space 26 downwardly recessed or passed through therefrom. The accommodating space 26 is used for containing the flexible buckling body 23. The flexible buckling body 23 comprises a flexible portion 231 and a buckling portion 232. The buckling portion 232 further has a guiding surface 2321. One end of the flexible portion 231 is disposed to a lower side near a side wall of the accommodating space 26 while another end is extended toward an upper side of the main body 21 and connected to the buckling portion 232. The buckling portion 232 protrudes out from the accommodating space 26, and the guiding surface 2321 faces toward the notch 22 with a tilt angle. The intersection portion between the flexible portion 231 and the buckling portion 232 forms a cavity 233. The size of the accommodating space 26 can allow the flexible buckling body 23 to perform a deformation process at certain degrees, so that the flexible buckling body 23 can cross over the through hole 12 of the windshield wiper arm 1. The guiding surface 2321 of the buckling portion 232 is used for guiding the buckling portion 232 to cross a leading side 121 of the through hole 12 throughout the deformation process caused by the leading side 121 propping the buckling portion 232, such that the leading side 121 may then rest in the cavity 233. In the embodiment, the guiding surface 2321 is an oblique plane and can be other patterns, such as arc surfaces, ladder surfaces, in actual implementation. The first lodging portion 24 and the second lodging portion 25 can be respectively disposed on two side surfaces of the rear end of the main body 21. The shapes of the first lodging portion 24 and the second lodging portion 25 are matched with the first barb portion 13 and the second barb portion 14 of the windshield wiper arm 1. In the subsequent depiction, the flexible buckling body 23 is also called as the flexible buckling device. The first lodging portion 24 and the second lodging portion 25 are also called as the lodging devices.

With reference to FIG. 5 to FIG. 8, in which a first schematic diagram, a second schematic diagram, a third schematic diagram and a fourth schematic diagram of a windshield wiper adapter according to an embodiment of the invention are depicted. In the embodiment, a windshield wiper has been installed underneath the windshield wiper adapter 2. When a user would like to assemble the windshield wiper adapter 2 and the conventional windshield wiper arm 1, the windshield wiper arm 1 can be placed on the windshield wiper adapter 2 to allow the protrusion portion 11 of the windshield wiper arm 1 to face toward a front end of the main body 21 of the windshield wiper adapter 2. Next, the protrusion portion 11 of the windshield wiper arm 1 is engaged with the notch 22 in front of the main body 21 of the windshield wiper adapter 2. Taking the engaged portion of the windshield wiper arm 1 as an axis, a rear end of the windshield wiper arm 1 is downwardly rotated. The through hole 12 of the windshield wiper arm 1 would gradually approach the flexible buckling body 23 of the windshield wiper adapter 2. When the leading side 121 of the through hole 12 of the windshield wiper arm 1 is in contact with the guiding surface 2321 of the buckling portion 232 of the flexible buckling body 23, and the windshield wiper arm 1 is further downwardly rotated, the leading side 121 would prop the guiding surface 2321, and the flexible portion 231 of the flexible buckling body 23 would perform the deformation process away from a direction of the leading side 121 of the through hole 12 due to the force downwardly pushing the windshield wiper arm 1. When the leading side 121 of the through hole 12 of the windshield wiper arm 1 crosses the buckling portion 232 along the guiding surface 2321 of the buckling portion 232, it would downwardly slide to the cavity 233 formed between the flexible portion 231 and the buckling portion 232. In the meantime, since the leading side 121 of the through hole 12 of the windshield wiper arm 1 is no longer pushing the buckling portion 232 of the flexible buckling body 23, the flexible portion 231 of the flexible buckling body 23 would be restored from the deformation process so that the leading side 121 of the through hole 12 of the windshield wiper arm 1 leans tightly against the cavity 233, and the buckling portion 232 of the flexible buckling body 23 snaps a portion of a top surface of the leading side 121 of the through hole 12 of the windshield wiper arm 1. Accordingly, a snapping motion of fastening the windshield wiper arm 1 on the windshield wiper adapter 2 is completed. When the buckling portion 232 of the flexible buckling body 23 is lodged with the windshield wiper arm 1, the first lodging portion 24 and the second lodging portion 25 of the windshield wiper adapter 2 respectively and correspondingly lean against the first barb portion 13 and the second barb portion 14 of the windshield wiper arm 1, and the protruding rib 221 in the notch 22 in front of the main body 21 of the windshield wiper adapter 2 is tightly leaned against the protrusion portion 11 of the windshield wiper arm 1.

Figure 7:
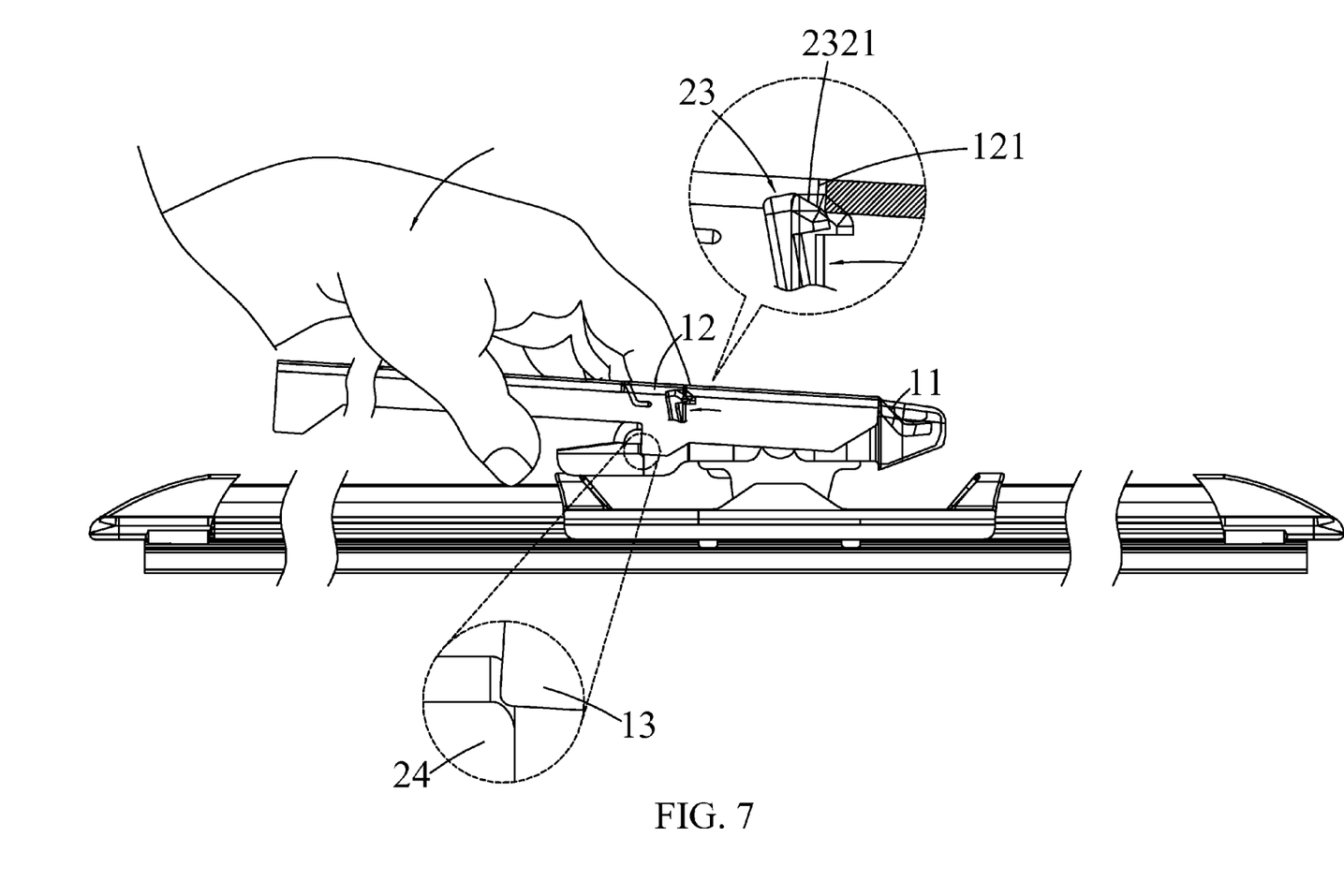
FIG. 7 is a third schematic diagram of assembling a windshield wiper adapter and a windshield wiper arm according to an embodiment of the invention.
Figure 8:
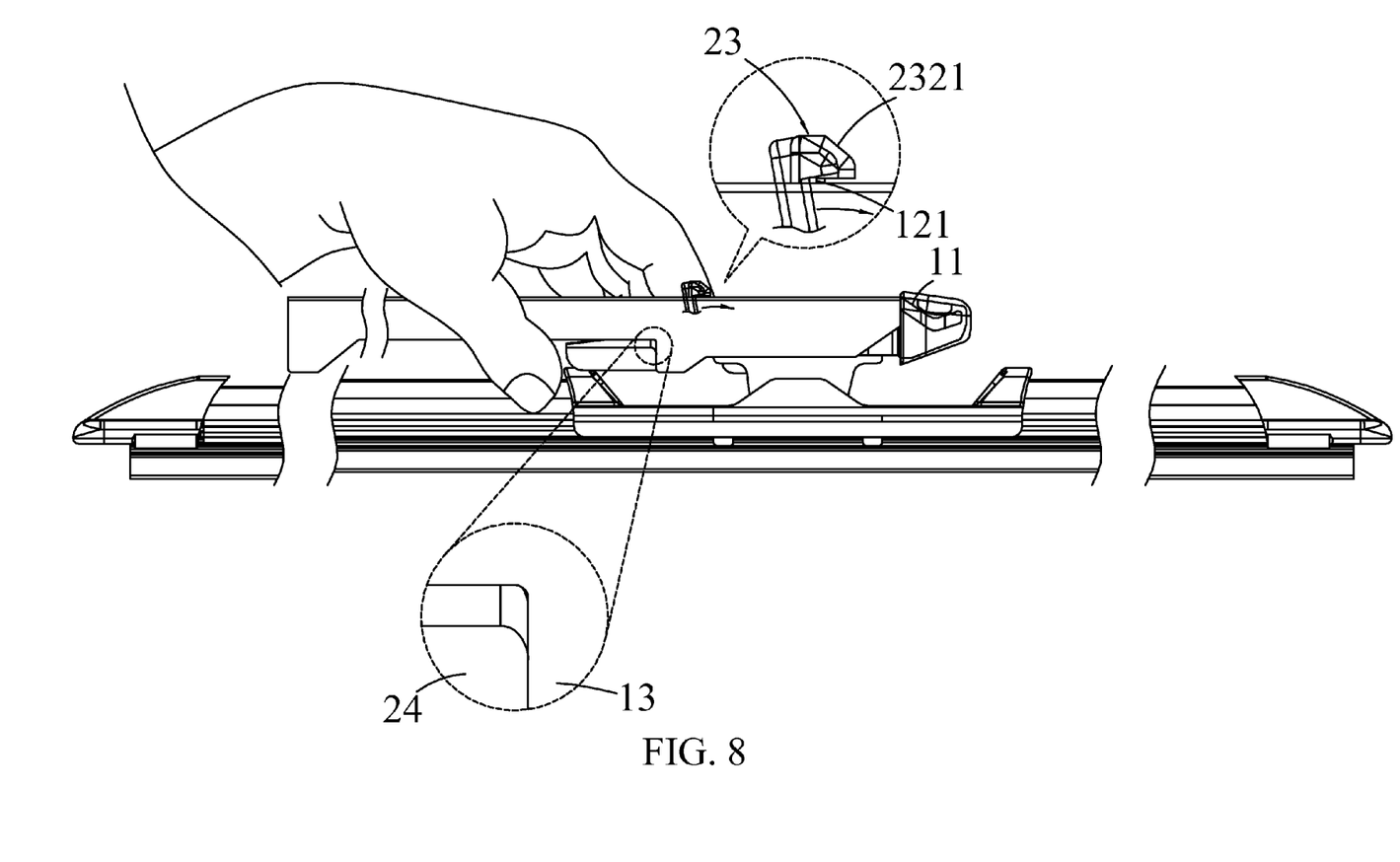
FIG. 8 is a fourth schematic diagram of assembling a windshield wiper adapter and a windshield wiper arm according to an embodiment of the invention.

In the embodiment, since the windshield wiper adapter 2 of the invention uses the flexible buckling body 23 made of the flexible material to snap a portion the top surface of the leading side 121 of the through hole 12 of the windshield wiper arm 1, the size of the accommodating space 26 is sufficient to allow the flexible buckling body 23 to perform the deformation process within a certain degree so that the leading side 121 of the through hole 12 of the windshield wiper arm 1 is able to cross the buckling portion 232 of the flexible buckling body 23. Accordingly, the user does not need to impose too much force and concern the angular range to easily assemble the windshield wiper arm 1 with the windshield wiper adapter 2. The foregoing manner can prevent the flexible buckling body 23 from being rubbed by the leading side 121 of the through hole 12 of the windshield wiper arm 1. Intervals are remained between the first barb portion 13 and the second barb portion 14 of the windshield wiper arm 1 and the first lodging portion 24 and the second lodging portion 25 of the windshield wiper adapter 2 respectively, as shown in FIG. 7. Accordingly, the first lodging portion 24 and the second lodging portion 25 can be prevented from being too tightly in contact with the first barb portion 13 and the second barb portion 14, resulting in rubbing against the first lodging portion 24 and the second lodging portion 25. When the windshield wiper arm 1 is connected to the windshield wiper adapter 2, the first lodging portion 24 and the second lodging portion 25 of the windshield wiper adapter 2 can lean against the first barb portion 13 and the second barb portion 14 of the windshield wiper arm 1 to prevent the windshield wiper arm 1 from sliding toward the rear end of the main body 21 of the windshield wiper adapter 2. The notch 22 of the windshield wiper adapter 2 can snap the protrusion portion 11 of the windshield wiper arm 1 to prevent the windshield wiper arm 1 from sliding toward the front end of the main body 21 of the windshield wiper adapter 2. The protruding rib 221 disposed in the notch 22 is leaned tightly against the protrusion portion 11 of the windshield wiper arm 1 so that both elements can be more stable. The flexible buckling body 23 of the windshield wiper adapter 2 is an element to mainly buckling and fastening the windshield wiper arm 1. Since a portion of the top surface of the windshield wiper arm 1 is snapped with the buckling portion 232 of the flexible buckling body 23, the windshield wiper arm 1 can be prevented from coming off the upper direction of the main body 21 of the windshield wiper adapter 2.

Figure 9:
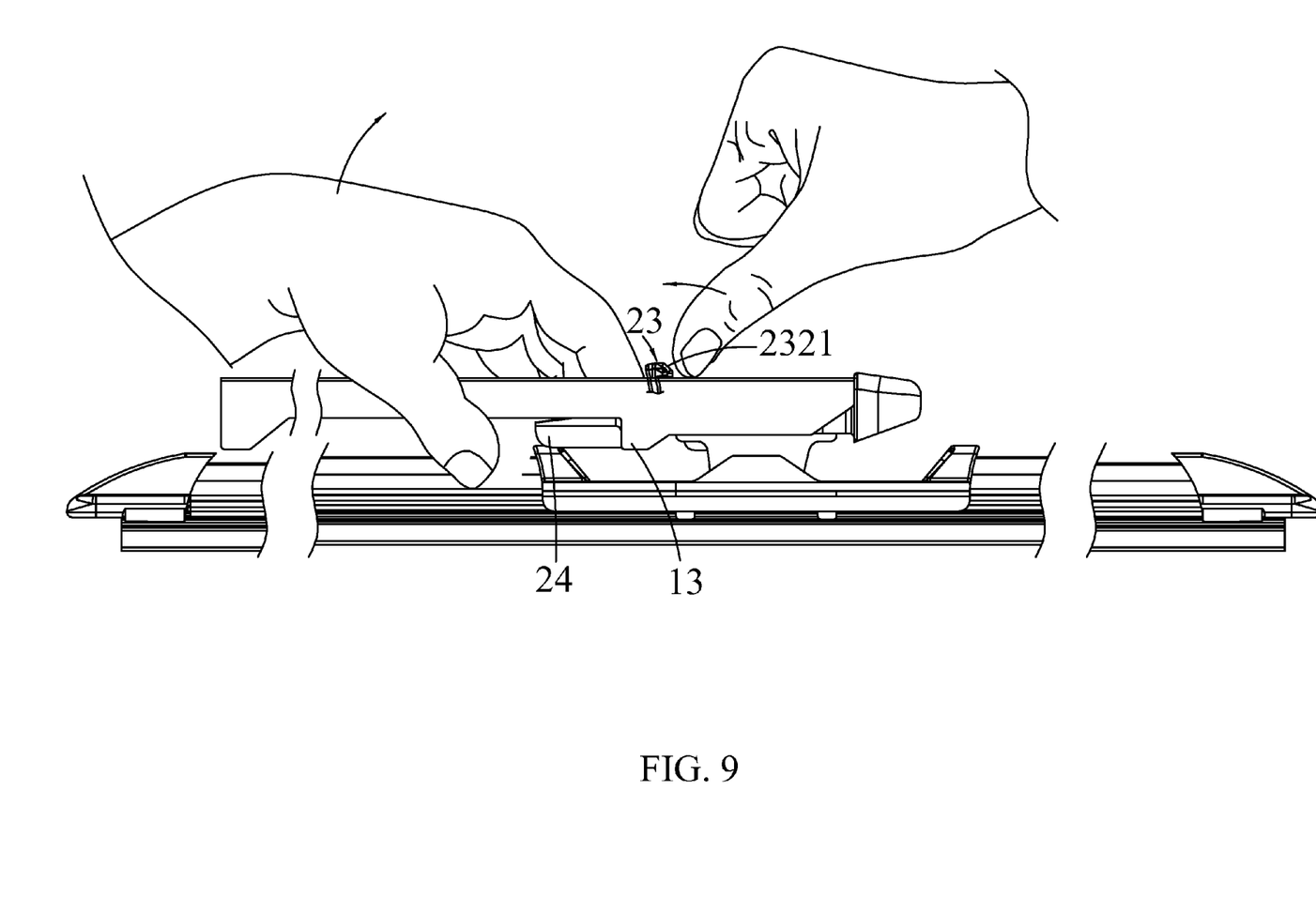
FIG. 9 is a first schematic diagram of detaching a windshield wiper adapter from a windshield wiper arm according to an embodiment of the invention.
Figure 10:
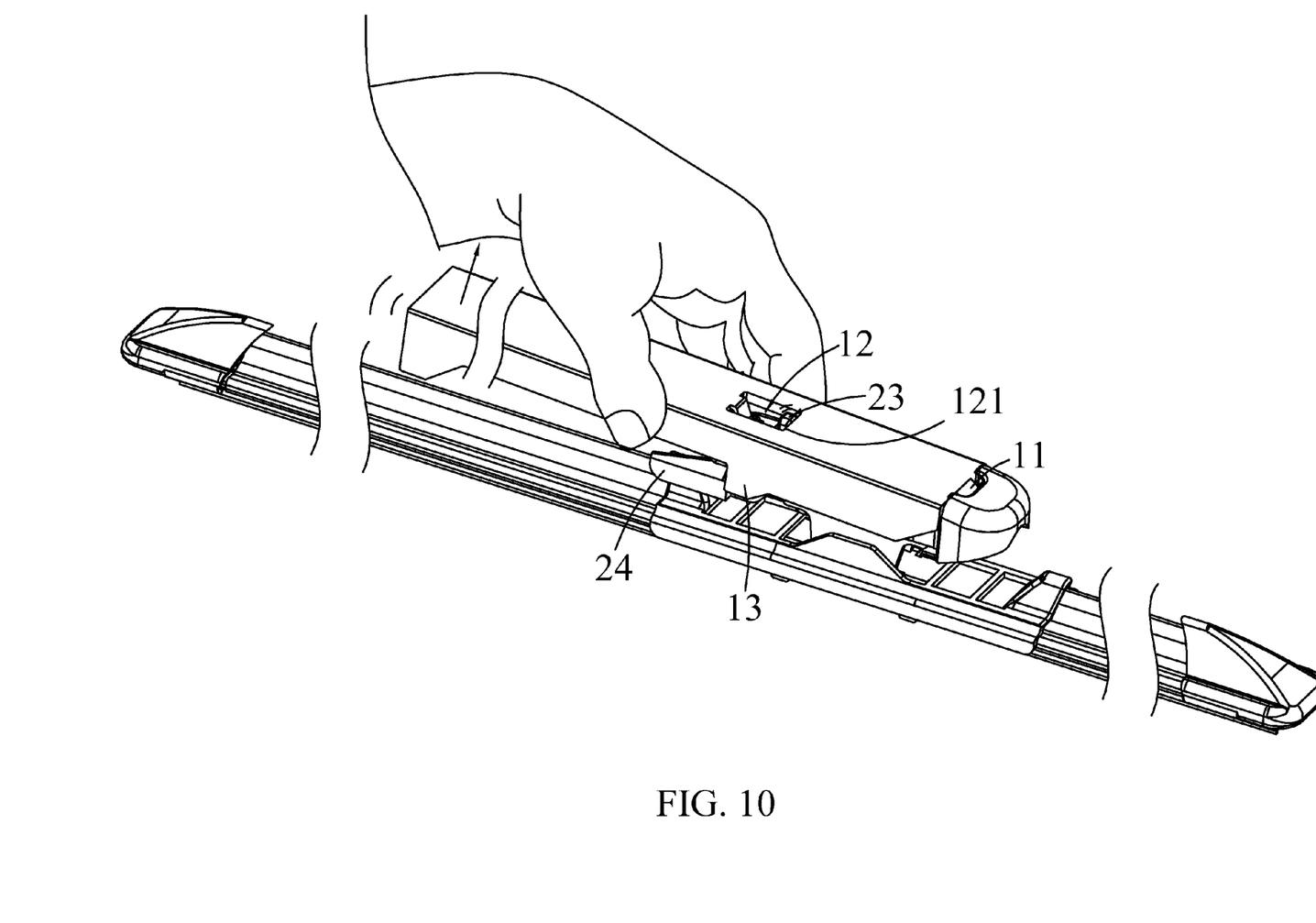
FIG. 10 is a second schematic diagram of detaching a windshield wiper adapter from a windshield wiper arm according to an embodiment of the invention.
Figure 11:
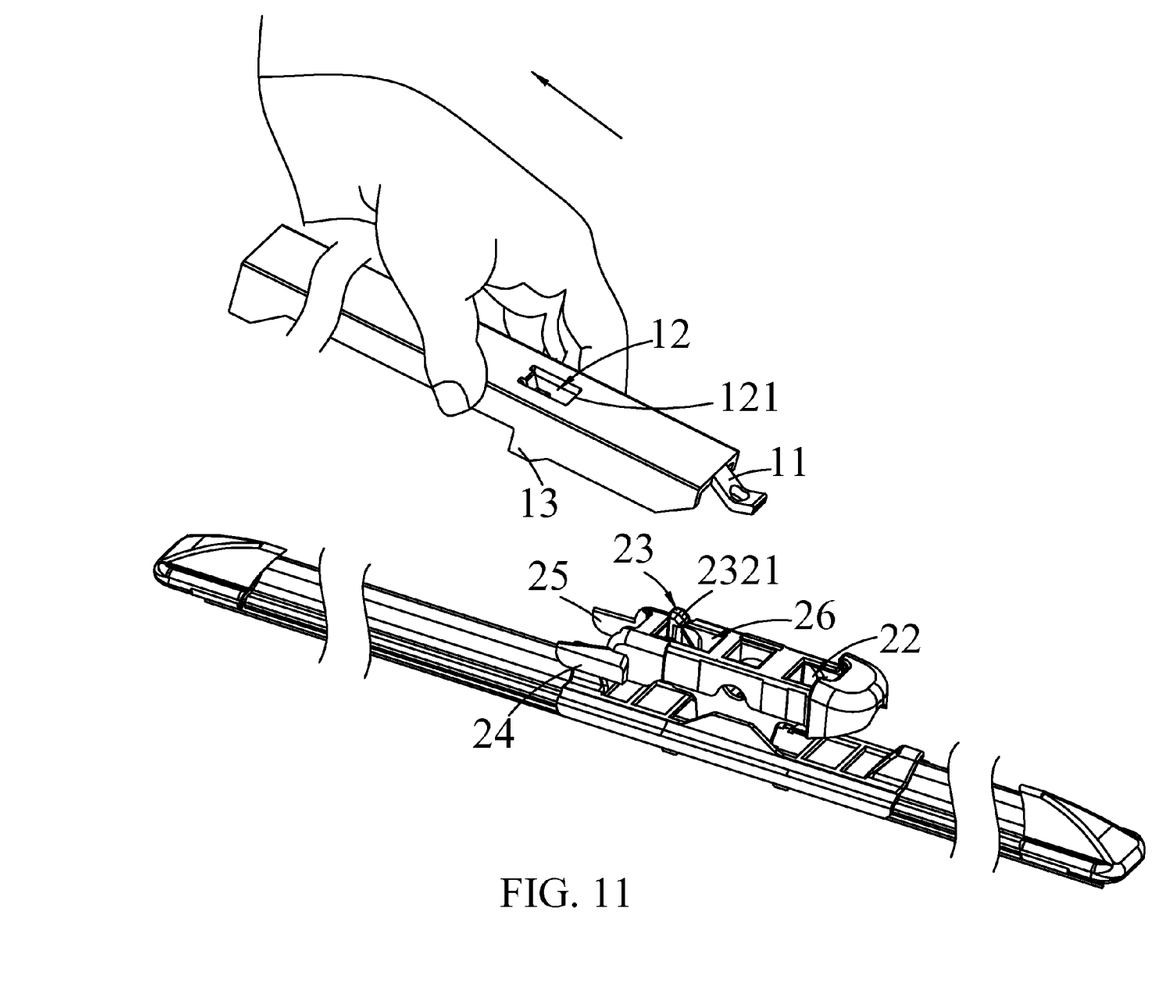
FIG. 11 is a third schematic diagram of detaching a windshield wiper adapter from a windshield wiper arm according to an embodiment of the invention.

With reference to FIG. 9 to FIG. 11, in which a first schematic diagram, a second schematic diagram and a third schematic diagram of detaching the windshield wiper adapter from the windshield wiper arm according to the embodiment of the invention are depicted. In the embodiment, while detaching the windshield wiper arm 1 from the windshield wiper adapter 2, the user merely uses fingers to bend the flexible buckling body 23 of the windshield wiper adapter 2 to allow the flexible buckling body 23 to be separated from the through hole 12 of the windshield wiper arm 1, and the first barb portion 13 and the second barb portion 14 at the rear end of the windshield wiper arm 1 would disengage the first lodging portion 24 and the second lodging portion 25 of the windshield wiper adapter 2 such that both can be easily detached after the rear end of the windshield wiper arm 1 is sprung upwardly.

The user can conveniently connect the windshield wiper adapter 2 of the invention to the conventional windshield wiper arm 1 under with less restricted coupling angles. While performing the motion of detaching the windshield wiper arm 1 from the windshield wiper adapter 2, the windshield wiper arm 1 can be easily separated from the windshield wiper adapter 2 by merely bending the flexible buckling body 23 of the windshield wiper adapter 2. It is so convenient in both assembling and detaching. The flexible buckling body 23 of the windshield wiper adapter 2 is snapped with the leading side 121 of the through hole 12 of the windshield wiper arm 1. The protruding rib 221 of the notch 22 of the windshield wiper adapter 2 is lodged with the protrusion portion 11 of the windshield wiper arm 1, and the first lodging portion 24 and the second lodging portion 25 of the windshield wiper adapter 2 respectively lean against the first barb portion 13 and the second barb portion 14 of the windshield wiper arm 1. The windshield wiper arm 1 can be stably connected to the windshield wiper adapter 2. Since the flexible buckling body 23, the first lodging portion 24 and the second lodging portion 25 are elements made of flexible materials, the flexible buckling body 23 can further perform the deformation process. Accordingly, while assembling or detaching the windshield wiper arm 1 and the windshield wiper adapter 2, a buffer can be obtained to greatly reduce the first lodging portion 24 and the second lodging portion 25 from being damaged by the first barb portion 13 and the second barb portion 14 of the windshield wiper arm 1.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A windshield wiper adapter comprising:
    a main body, a front end of the main body having a downwardly recessed notch, the notch provided for being engaged with a protrusion portion of a windshield wiper arm at an arbitrary angle; and
    a flexible buckling device, comprising a flexible portion and a buckling portion, one end of the flexible portion connected to a lower side of an accommodating space closer to the front end of the main body than another end of the flexible portion that is upwardly extending toward an upper side of the accommodating space and connected to the buckling portion, the buckling portion protrudes out from the accommodating space, the flexible buckling device provided for engaging a leading side of a through hole of the windshield wiper arm, wherein where the main body connected to the flexible buckling device forms the accommodating space downwardly recessed or piercing through the upper side of the main body;
    wherein after the notch is engaged with the protrusion portion, the windshield wiper arm is rotated about a coupling portion therebetween, so that the flexible buckling device is engaged with the leading side of the through hole to firstly perform a deformation process toward a direction away from the leading side, and then the flexible buckling device is engaged to the leading side of the through hole after restoring from the deformation process, thereby fastening the windshield wiper arm on the main body.

2. The windshield wiper adapter as recited in claim 1, further comprising a lodging device arranged on two sides of a rear end of the main body, wherein when the flexible buckling device is engaged to the leading side of the through hole, the lodging device is used for lodging a barb portion of the windshield wiper arm.

3. The windshield wiper adapter as recited in claim 2, wherein the lodging device is a flexible component.

4. The windshield wiper adapter as recited in claim 1, wherein the flexible portion is connected to the buckling portion and forms a cavity therebetween, and the buckling portion further comprises a guiding surface, wherein when the through hole is approached to the flexible buckling device, the leading side of the through hole leans against the guiding surface to allow the flexible portion to perform the deformation process in the direction away from the leading side, and after the leading side is guided by the guiding surface and crosses the buckling portion, the leading side recess in the cavity and mutually leans against each other, and the flexible portion is restored from the deformation process to couple to a portion of a top surface of the windshield wiper arm through the buckling portion.

5. The windshield wiper adapter as recited in claim 4, wherein the guiding surface faces toward the notch.

6. The windshield wiper adapter as recited in claim 5, wherein the accommodating space is sufficient to allow the flexible buckling device to perform the deformation process toward the direction away from the leading side of the through hole so that the leading side of the through hole is able to cross the buckling portion.

7. The windshield wiper adapter as recited in claim 1, wherein the notch of the main body is disposed with a protruding rib, the protrusion portion of the windshield wiper arm is an arc-shaped sheet body, and when the notch is engaged with the protrusion portion, the protruding rib is tightly leaned against the arc-shaped sheet body.

8. The windshield wiper adapter as recited in claim 1, wherein the front end of the main body is round in shape.

9. A windshield wiper assembly comprising:
   a windshield wiper adapter comprising a main body, a front end of the main body being disposed with a notch, a surface of the main body being disposed with a flexible buckling body, the flexible buckling body comprising a flexible portion and a buckling portion, the flexible portion being connected to the buckling portion and forming a cavity therebetween, the buckling portion further comprising a guiding surface; and
   a windshield wiper arm, one end of which being disposed with a protrusion portion, and a surface of which being disposed with a through hole;
   wherein after the notch is engaged with the protrusion portion, the windshield wiper arm is rotated about a coupling portion therebetween, so that the guiding surface of the buckling portion is engaged with a leading side of the through hole to firstly perform a deformation process toward a direction away from the leading side, and then the buckling portion is engaged to a portion of a top surface of the windshield wiper arm after restoring from the deformation process, thereby fastening the windshield wiper arm on the main body;
   wherein where the main body connected to the flexible buckling body forms an accommodating space downwardly recessed or piercing through an upper side of the main body, the flexible buckling body is disposed in the accommodating space, one end of the flexible portion is connected to a lower side of the accommodating space closer to the front end of the main body than another end of the flexible portion that is upwardly extended toward an upper side of the accommodating space and connected to the buckling portion, the buckling portion protrudes out from the accommodating space.

10. The windshield wiper assembly as recited in claim 9, wherein the windshield wiper adapter further comprises a first lodging portion and a second lodging portion respectively arranged on two sides of a rear end of the main body.

11. The windshield wiper assembly as recited in claim 10, wherein a first barb portion and a second barb portion are further disposed on two sides of the windshield wiper arm respectively, and when the buckling portion is engaged to the portion of the top surface of the windshield wiper arm, the first lodging portion and the second lodging portion respectively lodge the first barb portion and the second barb portion of the windshield wiper arm.

12. The windshield wiper assembly as recited in claim 10, wherein the first lodging portion and the second lodging portion are flexible components.

13. The windshield wiper assembly as recited in claim 9, wherein the notch of the main body is disposed with a protruding rib, the protrusion portion of the windshield wiper arm is an arc-shaped sheet body, and when the notch is engaged with the protrusion portion, the protruding rib is tightly leaned against the arc-shaped sheet body.

14. The windshield wiper assembly as recited in claim 9, wherein the guiding surface faces toward the notch.

15. The windshield wiper assembly as recited in claim 14, wherein the accommodating space is sufficient to allow the flexible buckling body to perform the deformation process toward the direction away from the leading side of the through hole so that the leading side of the through hole is able to across the buckling portion.

16. The windshield wiper assembly as recited in claim 9, wherein the front end of the main body is round in shape.

* * * * *